United States Patent [19]

Dutta et al.

[11] Patent Number: 5,650,225

[45] Date of Patent: Jul. 22, 1997

[54] THREE-DIMENSIONAL, SEAMLESS WATERPROOF BREATHABLE FLEXIBLE COMPOSITE MATERIAL

[75] Inventors: Anit Dutta; Robert Lyon Henn, both of Wilmington, Del.

[73] Assignee: W. L. Gore & Associates, Inc., Newark, Del.

[21] Appl. No.: 694,223

[22] Filed: Aug. 8, 1996

Related U.S. Application Data

[63] Continuation of Ser. No. 404,217, Mar. 14, 1995, abandoned, which is a continuation of Ser. No. 239,085, May 6, 1994, abandoned.

[51] Int. Cl.$^6$ .......................... B32B 27/06; B32B 27/12; B32B 27/40

[52] U.S. Cl. ...................... 428/318.4; 428/315.5; 428/315.9; 428/318.6; 428/319.7; 428/35.7; 428/36.1; 428/36.5; 2/167; 2/168; 442/71; 442/76; 442/89

[58] Field of Search ........................ 428/246, 286, 428/315.5, 315.9, 318.4, 318.6, 319.7, 35.7, 36.1, 36.5; 2/167, 168

[56] References Cited

U.S. PATENT DOCUMENTS

| | | |
|---|---|---|
| 3,501,326 | 3/1970 | Hochberg et al. |
| 3,650,880 | 3/1972 | Tieniber. |
| 3,660,218 | 5/1972 | Shepherd et al. |
| 3,694,301 | 9/1972 | Gruenwald et al. |
| 3,836,423 | 9/1974 | Wagner et al. |
| 4,216,251 | 8/1980 | Nishimura et al. |
| 4,443,511 | 4/1984 | Worden et al. |
| 4,515,852 | 5/1985 | Katabe et al. ............... 428/246 |
| 4,632,860 | 12/1986 | D'Antonio et al. |
| 4,888,829 | 12/1989 | Kleinerman et al. |
| 5,204,156 | 4/1993 | Lamb et al. |
| 5,244,716 | 9/1993 | Thornton et al. |
| 5,351,698 | 10/1994 | Wheeler et al. ............... 128/844 |

FOREIGN PATENT DOCUMENTS

| | | |
|---|---|---|
| 0106440 | 4/1984 | European Pat. Off. |
| 0310037 | 4/1989 | European Pat. Off. |
| 0398611 | 11/1990 | European Pat. Off. |
| 2024100 | 1/1980 | United Kingdom. |
| 2181691 | 4/1987 | United Kingdom. |
| WO900643 | 1/1990 | WIPO. |

OTHER PUBLICATIONS

The English translation of JP.A.06 073 669 (Seiko) Mar. 1994.

Derwent Publication Ltd., JP.A. 06 073 669 (Seiko Kasei KK) 15 Mar. 1994 (Abstract).

*Primary Examiner*—Kathleen Choi
*Attorney, Agent, or Firm*—Gary A. Samuels, Esquire

[57] ABSTRACT

Waterproof, breathable, flexible, seamless shaped articles, such as gloves or socks, are described which are made of a flexible layered composite comprising:

(a) a microporous thermoplastic polyester polyurethane or polyether polyurethane that is water vapor permeable, and (b) a nonporous copolymer that is waterproof but water vapor permeable which provides improved waterproofness to the microporous polymer layer.

5 Claims, 4 Drawing Sheets

THREE-DIMENSIONAL, SEAMLESS WATERPROOF BREATHABLE FLEXIBLE COMPOSITE MATERIAL

CROSS REFERENCE TO RELATED APPLICATION

This application is a continuation of application Ser. No. 08/404,217 filed Mar. 14, 1995 now abandoned, which is a continuation of Ser. No. 08/239,085 now abandoned, filed May 6, 1994.

FIELD OF THE INVENTION

This invention relates to three-dimensional, seamless, waterproof, breathable, flexible, composite articles for use in fabrics for clothing, such as gloves and stockings.

BACKGROUND OF THE INVENTION

Thin, breathable, form-fitting, articles such as gloves or socks are useful in many end uses, for example in medical, dental, or clean room applications.

One convenient way of making such articles is to simply dip appropriately shaped formers into liquid elastomeric compositions so as to form a continuous film over the surface of the former. The film is then dried to form a solid film in the shape of the former. By choosing an elastomer that is liquid waterproof but breathable, a comfortable form-fitting glove can be easily prepared in one step. Preferably such gloves should be thin, e.g. 0.1–0.5 mm, and desirably easily stretchable.

One such class of elastomeric compositions into which formers can be dipped are those to form waterproof, breathable, microporous polyester or polyether polyurethane coatings, such as are described in U.S. Pat. No. 4,888,829. However, such microporous polyurethanes tend to lose some of their liquid waterproof nature when water pressure is applied against them. In addition, such microporous polyurethanes are susceptible to pore-clogging and contamination by sweat, etc.

Another class of elastomeric composition into which formers can be dipped are solutions of hydrophilic polymers which when added form a non-porous, liquid water impermeable but water vapor permeable film on the shape former. Typically, such non-porous films are stiffer than microporous films as evident from higher modulus under tensile deformation. Since these unsupported non-porous films need to be of a certain minimum thickness for them to be useful as articles like gloves or socks, such articles are not very comfortable. Specifically, they are noisy and stiff, leading to poor fit and dexterity. It would be desirable to provide a film useful in form-fitting gloves, or useful in making a film for use in fabric structures that does not have the deficiencies recited above.

SUMMARY OF THE INVENTION

This invention overcomes the deficiencies recited above by providing seamless shaped articles, such as gloves, socks or films, made of a flexible layered composite. One layer (I) of the composite is a microporous, elastomeric, thermoplastic polyester polyurethane or polyether polyurethane that is water vapor permeable. A second non-porous layer (II) is a hydrophilic nonporous continuous polymer that is waterproof but water vapor permeable and which improves the waterproofness of the composite over that of the microporous polyurethane layer (I) alone.

In one aspect the article is in the form of a glove. In another, it is in the form of a sock.

Preferably layer II will be 0.5 to 2 mils thick and layer I will be 5 to 50 mils thick.

By "hydrophilic" is meant that the material has a strong affinity for water and is capable of transporting water molecules through it. A convenient measure of affinity for water is the amount of water absorbed by the polymer under specified conditions. ASTM D570 is such a standard test method for determining water absorption of plastics. As used herein, hydrophilic is any polymer that shows greater than 5% (24 hour water absorption as per ASTM D570) water absorption by weight.

By "microporous" is meant that the layer has continuous pores from one side to the other that are very small.

By "breathable" is meant that the article has the ability to pass water vapor, such as in evaporated perspiration.

By "form-fitting" is meant that the gloves or socks, etc., will fit tightly around a hand or foot. The gloves should be thin and elastomeric in order to maintain good sensitivity for the wearer.

By "nonporous" is meant that there are no pores or passageways through the layer. One consequence is that the layer is not air permeable.

By "shaped article" is meant a form occupying a three-dimensional spacial configuration. As applied to garments it means a glove, hat or sock, rather than a planar film.

DETAILED DESCRIPTION OF THE INVENTION

Layer I-Polyurethanes

Figure 1:
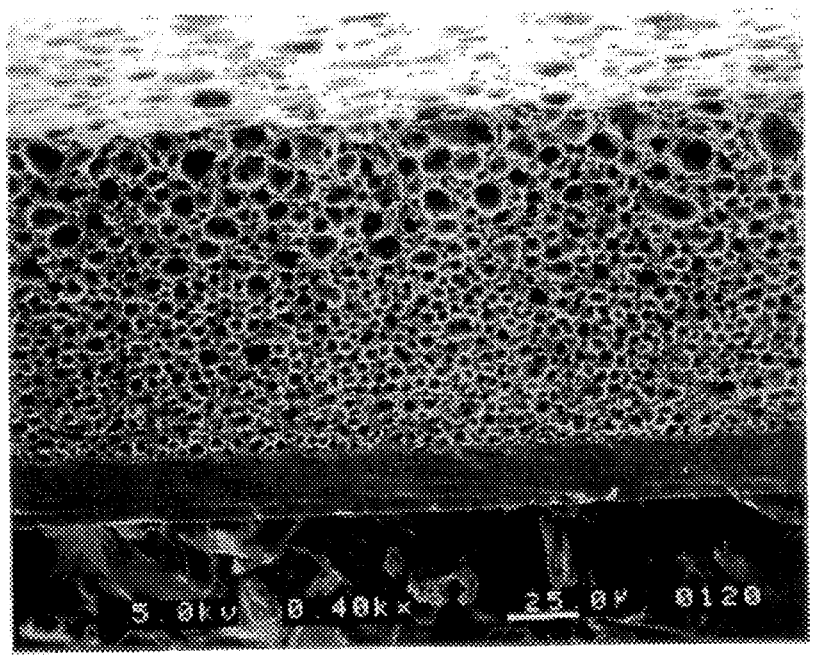
FIG. 1 is a photomicrograph of the cross-section of the sample described in Example 1 at 400× magnification.

The microporous elastomeric, thermoplastic polyester polyurethanes or polyether polyurethanes used for layer I preferably have recovery properties intermediate between pure rubbers and pure thermoplastic materials at room temperature.

The polyurethanes of layer I may be based on a wide variety of precursors which may be reacted with a wide variety of polyols and polyamines and polyisocyanates. As is well known the particular properties of the resulting polyurethanes to a large extent can be tailored by suitable choice of the reactants, reaction sequence and reaction conditions.

The preferred polyurethanes for layer I are elastomeric polyurethanes based on a linear, hydroxyl terminated polyester (although a polyether polyol or a polyether/polyester blend may be used) and a diisocyanate, with a small addition of a difunctional low molecular weight reactant. The last mentioned component may be added either with the other reactants at the start of a one-step polymerization or at a later stage when it will act primarily as a chain extender or partly at the start and partly later.

Particularly preferred polyurethanes for layer I are those derived from polyesters by reaction with diols and diisocyanates. As is known from U.S. Pat. No. 2,871,21 8 many different polyesters, diols and diisocyanates can be used, but a particularly suitable polyurethane system is one in which a polyester made from ethylene glycol and adipic acid is reacted with 1.4-butylene glycol and with 4,4'-diphenylmethane diisocyanate.

The mole ratio of polyester and diol can vary between quite wide limits but the combined number of moles of polyester and diol is arranged to be essentially equivalent to the number of moles of diisocyanate so that the resultant polymer is essentially free of unreacted hydroxyl or isocyanate groups.

The preferred polyurethane polymers for layer I are linear polyurethanes produced from a diisocyanate, a monomeric diol and a polyester polyol or a polyether polyol of molecular weight 1,000 to 3,000, the polyurethane having an intrinsic viscosity in dimethyl formamide of at least 0.5 dl/g.

Especially preferred polyurethanes for layer I may have a nitrogen content of about 3.0 to 4.0%, e.g. around 3.5%. Such material can be made by increasing the ratio of polyester to glycol resulting in a lower requirement of diisocyanate as compared to polyurethanes having a higher nitrogen content, such as 4.5% or more.

The polymers may be produced by a bulk polymerization process and subsequently dissolved in suitable solvents or may be prepared directly in solution by a solution polymerization process.

The polymer can include conventional stabilizers, fillers, processing aids, pigments, dyes, and additives such as surface active agents or proofing agents, and when the polymer content is quoted in the claims this includes any such additives which may replace up to 10% w/w of the polymer.

A further polyurethane system which has been found suitable for layer I uses polyesters derived from caprolactone. Such polyurethanes are described in British Patent Specification No. 859640.

Layer II-Nonporous Polymers

Turning now to the hydrophilic polymer component of layer II, it should have 24 hour water absorption value greater than 5% when tested as per ASTM D570.

Layer II can be formed from such materials disclosed in U.S. Pat. No. 4,194,041, the disclosure of which is incorporated herein by reference; and from hydrophilic elastomers including but not limited to elastomers made from poly(esters), poly(amides), cellulose derivatives, poly (acrylic acid) and its homologs, natural or synthetic rubber with hydrophilic impurities, copolyoxamides, polyureas, polyelectrolytes, poly(phosphates), poly(vinylamine), poly (vinylalcohol), poly(ether) and copolymers thereof, poly (thioether), polythioether-polyether, copoly (epichlorohydrinether), poly(sulphosphates), copolyester-ether and derivatives or mixtures thereof. Preferably, the hydrophilic polymer is a copolyetherester, polyurethane or a copolyetheresteramide. All these polymers are permeable to water vapor, but are highly impervious to liquid water.

A preferred class is hydrophilic copolyether esteramide. These polymers are a part of the general family of polyether block amide polymer chemistry as discussed in "Thermoplastic Elastomers-A Comprehensive Review" edited by N. R. Legge, G. Holden and H. E. Schroeder. The general formula of these copolymers is:

HO[CO—PA—CO—PE—O]$_n$H where PA is the polyamide block and PE is the polyether block. The development of these resins is described in U.S. Pat. No. 4,230,838 which also discusses the potential for formulating hydrophilic grades using poly(alkylene oxide) glycol for the polyester block. A typical example of such a resin is PEBAX\MX1074 available from Elf Atochem North America, Inc. The 24 hour water absorption capacity of this particular polymer is about 48% when tested as per ASTM D570.

The preferred hydrophilic copolyetherester polymers are segmented copolyesters that contain recurring long chain ester units of a dicarboxylic acid and a long chain glycol, and also contains recurring short chain ester units of a dicarboxylic acid and a short chain glycol. The glycol can contain ether units, in which case the copolyester is sometimes referred to as a copolyetherester. Hydrophilic copolyetherester compositions may be found in the teachings of U.S. Pat. No. 4,493,870 and U.S. Pat. No. 4,725,481 to Ostapchenko. A typical example of hydrophilic copolyetherester is Hytrel\HTR8171 available from E. I. DuPont de Nemours and Co. The 24 hour water absorption capacity of this particular polymer is about 61% when tested as per ASTM D570.

The preferred hydrophilic polyurethane polymers are segmented block copolymers having a high concentration of oxyethylene units to impart hydrophilicity. Suitable compositions of such hydrophilic polyurethanes may be found by way of example in the teachings of U.S. Pat. No. 4,194,041 to Gore and U.S. Pat. No. 4,532,316 to Henn as also in publications like that on page 1419 of volume 47 of Journal of Applied Polymer Science by N. S. Schneider, J. L. Illinger and F. E. Kanasz. Hydrophilic polyurethanes are commercially available in various forms—as solid resins, as reactive prepolymers and as solutions in organic solvent or solvent mixtures.

Preparation-Shaped Articles.

The invention also relates to methods of making the composites. In one method a seamless, waterproof, breathable and form fitting article of the invention can be made by dipping a non-porous shape former into a bath containing a solution of the hydrophilic polymer (Layer II) and withdrawing it from the solution at a controlled rate to obtain a desired distribution of the solution over its surface. Solvent is then removed, for example, by drying, from the coated former to form a thin solid film of the hydrophilic polymer on top of the former. If the polymer is reactive, as in case of polyurethane prepolymers, the film is cured to complete the process of non-porous film formation. Examples of such curing process may be by reaction with ambient moisture, by heating to unblock any curing agents mixed into the prepolymer or by subjecting it to various forms of radiation to initiate and propagate the curing reaction.

The former with the non-porous hydrophilic coating, Layer II, on it is then dipped into a solution of a thermoplastic polyurethane Layer I composition in polar solvents such as dimethyl formamide (DMF), dimethyl acetamide, dimethyl sulfoxide, N-methyl pyrrolidone or the like, that are miscible with the non-solvent used, and withdrawing it from the solution at a controlled rate. The coated former is then manipulated to obtain a desired distribution of the solution over its surface. The coated former is then immersed in a bath containing non-solvent or solvent/nonsolvent mixture (or mixtures) in order to convert the polyurethane coating into a microporous water vapor permeable coating. Some typical examples of the non-solvent are water and alcohol like methanol, ethanol, isopropyl alcohol. Water, however, is preferred due to environmental concerns and its ease of handling. The shaped composite article thus formed is then dried under ambient conditions or in an oven either after or before removing it from the shape former.

An added benefit of this composite construction is that due to the swelling of the hydrophilic polymer layer II, the shaped articles are relatively easily stripped from the former when the article is wet as compared to that when it is dry.

Alternatively, the former can be dipped first into a solution of the thermoplastic polyurethane for layer I in order to form the microporous layer. Once that is completed, the hydrophilic polymer layer can be formed. Preferably, the former will be in the shape of a hand or a foot.

In another variation, the hydrophilic polymer Layer II can be sandwiched between two microporous polyurethane layers. Conversely, the microporous polyurethane Layer I can be sandwiched between two layers of the hydrophilic polymer.

The above composite articles can also be provided with increased strength by forming the composite coating on a fabric, such as woven or non-woven shaped fabric liners that may or may not be stretchable. The hand or drape of the finished article can be controlled by controlling the depth of penetration by the coating liquids into the fabric liner. This can be done by altering the surface characteristics of the fabric liner by treating it with water repelling agents such that the coating liquid(s) does not instantaneously wet the liner. The time interval between coating deposition and beginning of coagulation can therefore be used to control the degree of penetration. Once the fabric liner is treated appropriately, the composite coating can be formed in several ways. For example:

(i) forming the nonporous polymer layer on the treated fabric liner and forming the microporous polyurethane layer on top of it.

(ii) forming the microporous polyurethane layer on top of the treated fabric and then forming the nonporous polymer layer on top of the microporous film.

(iii) by sandwiching the nonporous polymer layer between two layers of microporous polyurethane layers.

Examples of Preparation of Seamless Shaped Articles

SOLUTION A:

A solution of a hydrophilic nonporous copolyetherester elastomer was prepared as follows:

In a 10 gallon Versamix (Charles Ross & Son Co. New York) heated at 40° C., 19000 grams of 1,1,2-trichloroethane was charged along with 2200 grams of a hydrophilic copolyetherester elastomer (Hytrel\HTR 8171). The entire mass was stirred for 3 hours in order to obtain a clear solution. The solution was then discharged and stored at room temperature.

SOLUTION B:

A solution of a thermoplastic polyester polyurethane was made as follows:

In the 10 gallon Versamix heated at 40° C., 12200 grams of N,N-dimethylformamide (DMF) and 3100 grams of a thermoplastic polyester polyurethane TPU1 (weight average molecular weight of about 25000, specific gravity of 1.18, 24 hour water absorption of 1–2%) made by reacting MDI (diphenyl methane diisocyanate) with polycaprolactone diol and using butane diol as the chain extender) were charged. The entire mass was then stirred in the mixer for 4 hours under nitrogen in order to obtain a clear solution. The solution was discharged from the mixer into a plastic container and allowed to cool under ambient conditions.

13527 grams of the above solution was again charged into the above mixer along with a mixture of 458 cc of distilled water and 67.5 grams of nonionic surfactant (FLUORAD\, FC-430 from 3M). The entire mass was stirred for 1 hour at ambient temperature to obtain a clear solution. The solution was then discharged from the mixer and stored under ambient conditions.

Example 1

A non-porous ceramic handform (glazed finish from General Porcelain Co., New Jersey) was dipped (fingers first) into Hytrel SOLUTION A. The form was then withdrawn at a controlled speed, and allowed to drain for 3 minutes with the finger pointing downwards. After this, the form was inverted and allowed to drain for 60 seconds with the fingers pointing upwards. The form was reinverted and allowed to air dry with the fingers pointing downwards.

The form, so coated, was dipped in polyurethane SOLUTION B. The form was then withdrawn at a controlled speed, allowed to drain for 1 minute with fingers pointing down, then the form was inverted and allowed to drain for 30 seconds with the fingers pointing up and finally the form was immersed in a 50/50 DMF/water (Dimethyl formamide) mixture with fingers pointing down. After 15 minutes in the DMF/water mixture, the form was withdrawn and then immersed in water for 45 minutes after which the form was withdrawn and allowed to air dry. The glove shaped article was easily stripped from the former by injecting water between the glove and the former. The glove was destructively tested for various properties in the palm and the back of the palm area and the results are listed in Table 1.

Example 2

The same procedure was used as in Example 1 except, after dipping in SOLUTION B, the immersion times were 15 and 75 minutes in 50/50 DMF/water and in water respectively.

Example 3

The same procedure was used as in Example 1 except a ceramic handform with a bisque finish (from General Porcelain Co.) was used and, after dipping in SOLUTION B, the immersion times were 5 and 45 minutes in 50/50 DMF/water and in water respectively.

Example 4

The same procedure was used as in Example 3 except that, during step 2, after dipping in SOLUTION B, the coated handform was immersed only in water for 60 minutes.

Comparative Example C-1

The same procedure was used as in Example 1 except that the form was not dipped into SOLUTION A. It was dipped into polyurethane SOLUTION B only. Moreover, a handform with a bisque finish was used. As a result the glove formed has no hydrophilic nonporous polymer film layer. During stripping from the handform, the glove tore in the finger crotch areas.

Comparative Example C-2

A ceramic handform with a glazed finish was dipped (fingers first) in SOLUTION B, withdrawn at a controlled speed and drained for 1 minute with the fingers pointing down. The form was then inverted and drained for 20 seconds with the fingers pointing up. The form was then reinverted and immersed in water for 90 minutes after which it is withdrawn and air dried. Thus the glove has no hydrophilic nonporous polymer layer. The dried glove was then stripped off from the handform. The stripped glove was weak and tore in the finger crotch area during the process of stripping.

TABLE 1

|  | EXAMPLE | | | | | |
| --- | --- | --- | --- | --- | --- | --- |
|  | 1 | 2 | 3 | 4 | C-1 | C-2 |
| Samples from Back of the Palm Area | | | | | | |
| Thickness[1] | 7.80 | 7.20 | 8.36 | 12.3 | 9.30 | 3.40 |
| MVTR[2] | 7327 | 1502 | 1418 | 1109 | 1081 | 1902 |
| Suter Test[4] | F1 | P3 | P3 | P3 | P3 | F1 |
| Water Entry Pressure[3] | 119 | 123 | 114 | 108 | —very low— | |
| Stress at 100% strain[5] | 289 | 288 | 258 | 180 | 114 | 176 |
| Stress at Break[5] | 797 | 823 | 713 | 351 | 311 | 578 |
| Elongation at Break[5] | 539 | 545 | 551 | 418 | 472 | 483 |
| Tear Propagation[6] | 35.0 | 48.5 | 51.9 | 49.8 | 58.3 | 33.0 |
| Samples From the Palm Area | | | | | | |
| MVTR[2] | 4123 | 1996 | 1707 | 1222 | 1222 | 1215 |
| Suter Test[3] | P2 | P3 | P3 | P3 | P3 | F1 |
| Water Entry Pressure[4] | 120 | 124 | 110 | 120 | —very low*— | |

[1] as described under "THICKNESS" in U.S. Patent 5,036,551 to Dailey. Units are in mils.
[2] as described under "WATER VAPOR TRANSMISSION RATE" in U.S. Pat. No. 5,036,551 to Dailey.
Units are in gm./sq.m./day.
[3] as per Federal Test Method Standard No. 191A, Method 5512. Units are in psi. A taffeta fabric restraint conforming to type III, Class I restraint of MIL-C-21852 was used.
[4] as per Federal Test Method Standard No. 191A, Method 5516. The first letter F or P respectively indicate if the sample did or did not leak water. The second digit indicates the pressure in psi at which this happened.
[5] as per ASTM D882-83. Units for stress are in psi.
[6] as per ASTM D1938. Units are maximum load per inch of sample thickness.
*cannot detect precisely, anywhere between 1 to 5 psi.

Example 5

The same procedure was used as in Example 1 except that a ceramic handform with bisque finish was used. The glove was tested for MVTR and the values were 1186 in the palm area. The waterproofness of the glove was then checked as per the "liquid water leakage" test procedure provided in U.S. Pat. No. 5,036,551. The glove received a pass rating.

Figure 2:
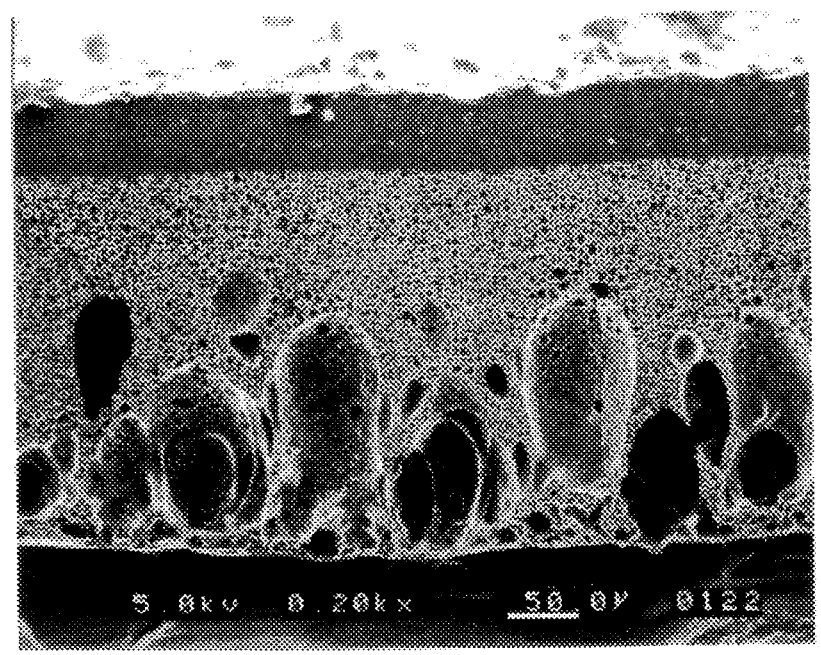
FIG. 2 is a photomicrograph of the cross-section of the sample described in Example 4 at 200× magnification.
Figure 3:
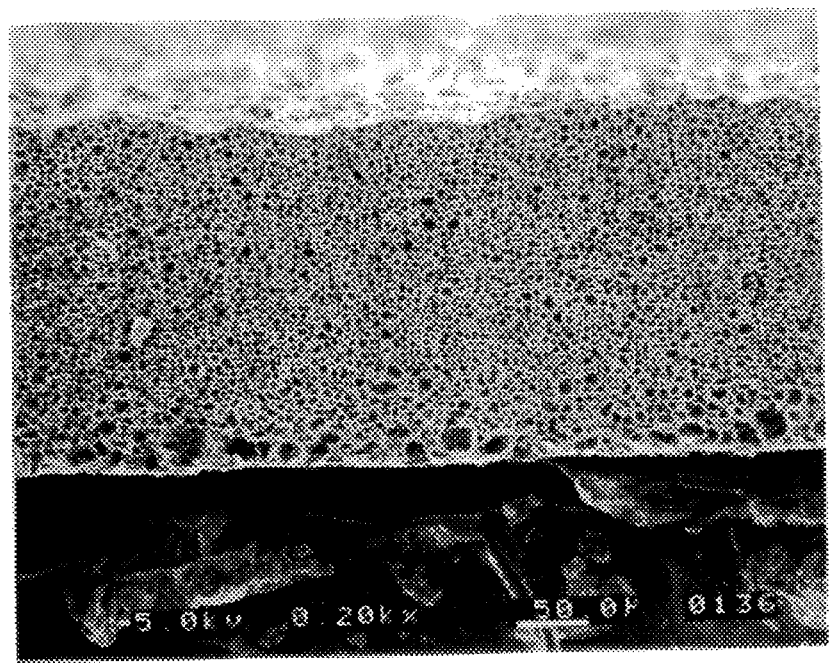
FIG. 3 is a photomicrograph of the cross-section of the sample described in Comparative Example C-1 at 200× magnification.
Figure 4:
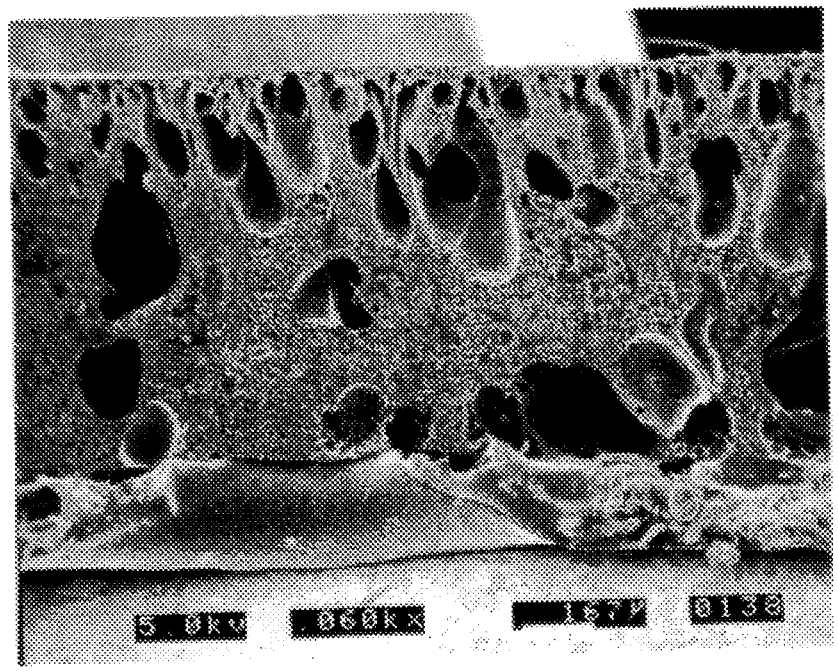
FIG. 4 is a photomicrograph of the cross-section of the sample described in Comparative Example C-5 at 60× magnification.
Figure 5:
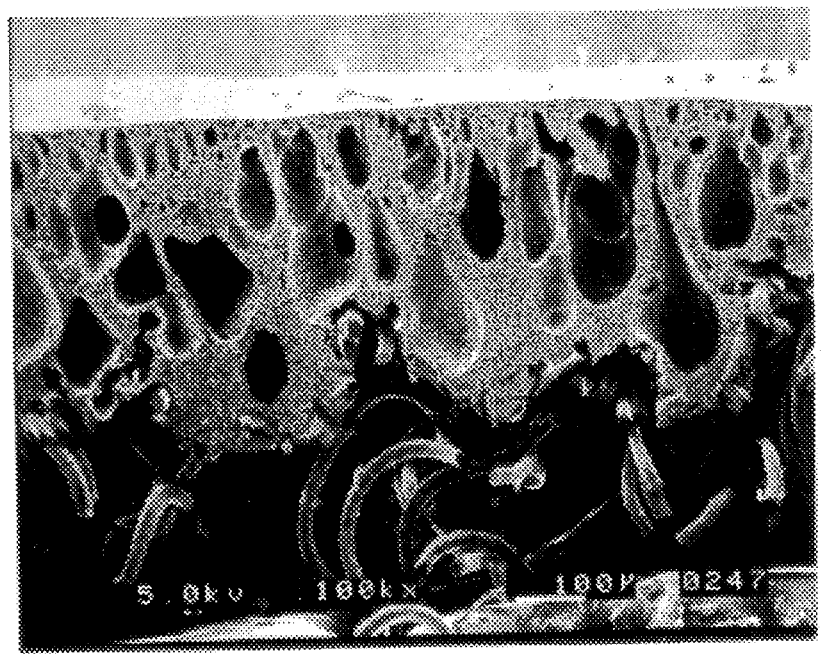
FIG. 5 is a photomicrograph of the cross-section of the sample described in Comparative Example C-4 at 100× magnification.
Figure 6:
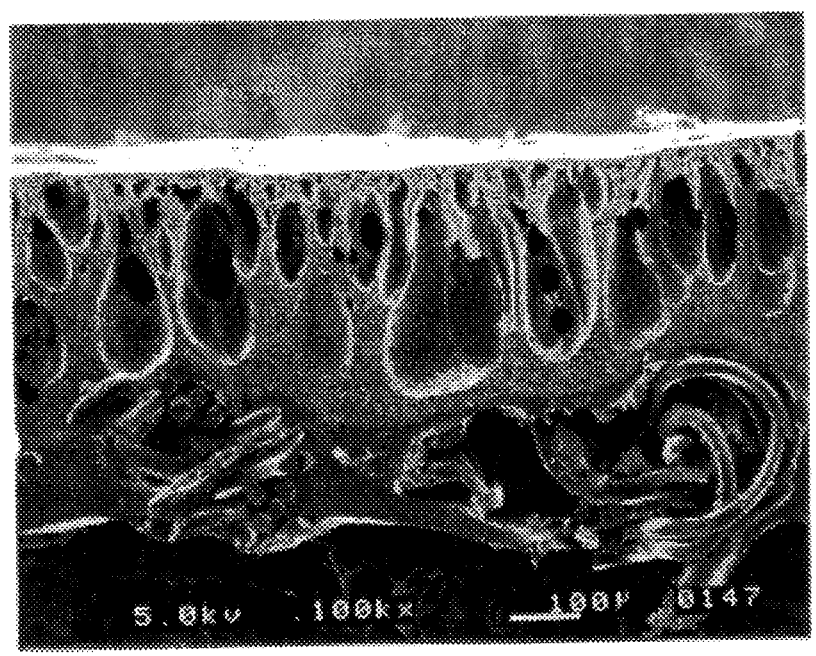
FIG. 6 is a photomicrograph of the cross-section of the sample described in Example 11 at 100× magnification.
Figure 7:
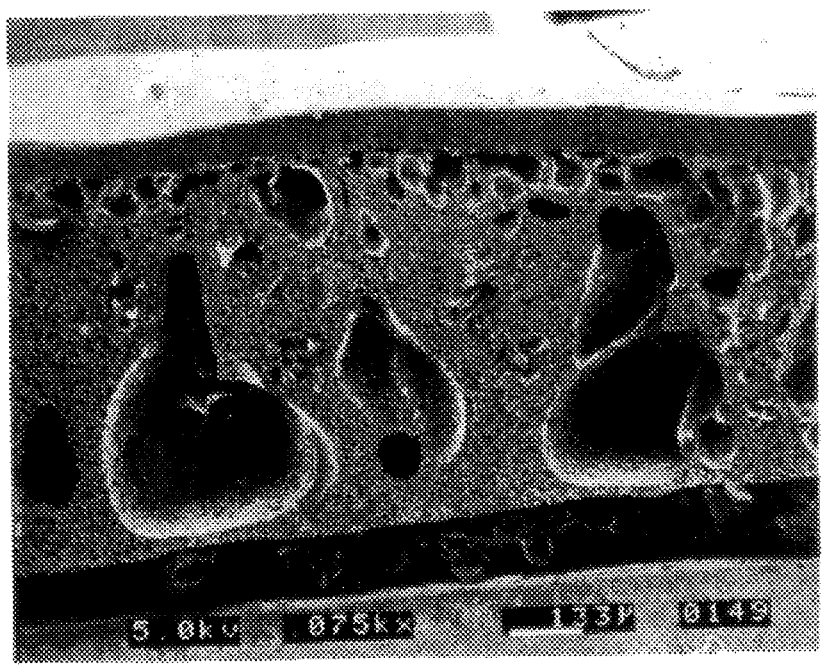
FIG. 7 is a photomicrograph of the cross-section of the sample described in Example 12 at 75× magnification.

FIGS. 1, 2 and 3 show the cross-sectional SEM micrographs of the samples described in Examples 1, 4 and C-1 respectively.

Example 6

SOLUTION C:

In a 10 gallon Versamix heated at 45° C., 17759 grams of Solution A was charged along with 3541 grams of 1,1,2-trichloroethane. The entire mass was stirred for 1 hour. The clear solution was then discharged and stored at room temperature for later use.

SOLUTION D:

A solution was first prepared by mixing 3550 grams of a thermoplastic polyester polyurethane TPU2 (Texin\480A from Miles Inc., weight average molecular weight=133000, specific gravity=1.20 and 24 hour water absorption of 1.5%) with 19310 grams of DMF for 5 hours in a 10 gallon Versamix at 40° C. The solution was then discharged and stored under ambient conditions for further processing. 20517 grams of this solution was recharged into the Versamix at 50° C. and a preblended mixture of 100 grams of a surfactant (Fluorad\FC-430), 721 grams of distilled water and 110 grams of a defoamer (BYK\-066 from BYK Chemie) was added. The entire mass was mixed for 150 minutes to obtain a clear homogeneous liquid. This liquid was then discharged and stored under ambient conditions.

A non-porous handform (bisque finish) was dipped (fingers first) into SOLUTION C. After 10 seconds, the form was then withdrawn at a controlled speed, drained of excess liquid for 60 seconds. After that, the form was gently rotated and inverted to allow the draining of the liquid to occur for 150 seconds with the fingers pointing upwards. The form was then reinverted, drained another 180 seconds with the fingers pointing downwards. The form was then allowed to dry completely in air with the fingers pointing up. Once the coating was dried, the entire procedure was repeated.

The handform, so coated, was dipped in polyurethane SOLUTION D. The form was then withdrawn at a controlled speed, allowed to drain for 1 minute with fingers pointing down, then the form was gently inverted and rotated and allowed to drain for 60 seconds with the fingers pointing up and finally the form was immersed in water with the fingers pointing down. After 60 minutes, the form was withdrawn, excess water was removed and then the coated form was dried in an oven at 80° C. for 30 minutes. The dried form was then immersed in water and the glove was stripped from the form and air dried.

The glove was destructively tested for various properties by taking samples from the palm or the back of the palm area. The data are shown in Table 2.

Comparative Example C-3

The same procedure as in Example 6 except that the form is not dipped into SOLUTION C. It was dipped into polyurethane SOLUTION D only. During stripping from the handform, the glove tore in the finger crotch areas.

TABLE 2

|  | Example 6 | Comparative Example C-3 |
| --- | --- | --- |
| Thickness[1] | 9.63 | 12.58 |
| MVTR[2] | 713 | 1996 |
| Suter Test[4] | P3 | F1 |
| Water Entry Pressure[3] | 173 | 6 |
| Stress at 100% Strain[5] | 686 | 82 |
| Stress at Break[5] | 1677 | 403 |
| Elongation at Break[5] | 313 | 383 |
| Tear Propagation[6] | 62.7 | 23.5 |

Example 7

The same procedure as in Example 6 except that the handform was dipped in SOLUTION C only once to form a thinner hydrophilic coating. The waterproofness of the glove was then checked as in Example 5. The glove received a pass rating. In the palm area, the MVTR was 1223 and Suter test indicated no leakage at 3 psi water pressure.

Example 8

A hydrophilic polyoxyethylene polyether polyurethane made according to teachings of U.S. Pat. No. 4,532,316 and U.S. Pat. No. 5,036,551 was used in this example. When a moisture cured film of this hydrophilic polyurethane was tested as per ASTM D570, the 24 hour water absorption was 132%.

SOLUTION E:

A solution was prepared by dissolving about 100 grams of this hydrophilic, reactive polyurethane in mixture of 225 grams of tetrahydrofuran (THF) and 75 grams of DMF. Stirring, at room temperature was necessary to obtain a clear solution.

A clean 300 ml. glass beaker was manually dipped in SOLUTION E, gently withdrawn from it and allowed to dry as well cure for 24 hours by reacting with the ambient moisture.

The coated glass beaker was then dipped manually in SOLUTION D, drained of the excess liquid and immersed in water for 60 minutes before drying it under ambient conditions. The dried shaped article was then stripped off the glass beaker and tested for leakage by filling it with water. No water leakage was noticed.

The article was then air dried, the bottom end was cut off to create a tube which was then split to create a flat film. In an area of the film where the thickness was about 30 mils, the MVTR was 879, the water entry pressure was 172 psi and the film showed no leakage even at 2.25 psi pressure in the Suter test. These results, when compared to those of comparative Example C-3, demonstrates the improved waterproofness of the present invention.

Example 9

SOLUTION F:

A breathable polyurethane solution SOLUCOTE TOP 932 (solids 42% approximately) was obtained from Soluol Chemical Co. A film was cast from this solution on release paper using a 20 mil drawdown bar (BYK Gardner) and dried under ambient conditions. The dried film was then heated in an oven at 155° C. for 5 minutes before peeling it off from the release paper. 24 hour water absorption of this film was 66%.

The SOLUCOTE TOP 932 solution was diluted by mixing 125 grams of it with 132 grams of toluene and 243 grams of DMF at room temperature. A clean 300 ml. glass beaker was manually dipped in SOLUTION F, gently withdrawn from it and allowed to dry under ambient conditions to form a hazy film. The coated glass beaker was then heated in an oven at 155° C. for 90 seconds.

The coated glass beaker was then dipped manually in SOLUTION D, drained of the excess liquid and immersed in water for 60 minutes before drying it under ambient conditions. The dried shaped article was then stripped off the glass beaker and air dried. The bottom end was then cut off to create a tube which was further split into a flat film. In an area of the film where the thickness was about 30-35 mils, the MVTR was 1483, the water entry pressure was 26 psi. These results indicate the improved waterproofness of the composite article over an article made from just microporous polyurethane as detailed in comparative Example C-3.

Example 10

A clean glass former in the shape of a large (about 3 inches diameter) test tube was dipped manually in SOLUTION F up to a height of about 5 inches, gently withdrawn and allowed to dry under ambient conditions to form a hazy film. The coated glass form was then heated in an oven at 155° C. for 2 minutes. Subsequently, the coated glass form is manually dipped in SOLUTION D up to a height of about 5 inches, drained of the excess and immersed in water for 60 minutes before drying it in air under ambient conditions. The dried shaped article was then stripped off the glass form and filled with water. No water leakage was noticed. The article was then dried and split to allow further testing. In an area of the film where the thickness was about 25 mils, the MVTR was 1497, the water entry pressure was 14 psi and the film showed leakage only at 1.5 psi pressure in the Suter test. When compared with the results of the comparative article C-3, the present article is seen to have improved waterproofness.

EXAMPLES OF PREPARATION OF SEAMLESS SHAPED ARTICLES WITH FABRIC SUPPORT

These examples are directed to making seamless sock inserts by forming the above composite film reinforced with a fabric support. The knitted fabric used was a Fashion Color Knee High (made of 100% nylon and distributed by American Stores Buying Company, Salt Lake City, Utah 84130) treated with fluorochemical based water-repelling agents to impart an oil rating of 6 as per AATCC Method No. 118–1983. Before the treatment, the oil rating was less than 1 and it was readily wetted by water.

Example 11

Step 1

The treated knee high was slipped on a shoe last (men's size 10 from Sterling Last Co., New York) and stretched adequately to conform exactly to the shape of the last. The entire assembly was then dipped (toe first) into SOLUTION A, and drained with the toe pointing down for 3 minutes. The last was then inverted and drained with the toe pointing up for 60 seconds and then it was air dried with the toe pointing down.

Step 2

The above last, with the hydrophilic polymer coated fabric on it, was then dipped (toe first) into SOLUTION B, withdrawn and drained for 1 minute and immersed into water for 48 hours. The last was then taken out of the water and air dried. After drying, the composite coating was then stripped from the last to give a seamless shoe-shaped article which is soft and elastic and can serve as a sock insert. The article was then tested for moisture vapor transmission and waterproofness. These are listed in Table 3.

Once the above sock insert was put on a foot, it gave a snug fit and was very comfortable because of its breathability and the low forces required to flex the foot. The above sock insert was also tested for water leakage by filling it up with 500 cc of water and observing for any signs of leakage. No water leakage was observed.

Example 12

The same procedure was used as in Example 11 except that step 2 was conducted first with 16 hours of immersion in water. The dried microporous layer (on the treated fabric support) was then coated with a thin layer of hydrophilic polymer as in step 1 of Example 11. Similar observations as in Example 11 showed no water leakage when filled with water.

Comparative Example C-4

The same procedure was used as in Example 12 except that no hydrophilic coating was deposited on the microporous layer. This sample was even softer and more elastic than samples in Examples 11 and 12. Even though it was extremely form fitting and comfortable, it leaked through isolated coating defects (like pinholes) when filled with 500 cc of water and showed signs of water seepage through the microporous layer under slight pressure.

Comparative Example C-5

The same procedure was used as in Comparative Example C-4 except that the fabric support was not treated with water repelling agents. This sample was also form fitting, but on filling with water it showed signs of seepage.

TABLE 3

|  | EXAMPLES | | | | |
| --- | --- | --- | --- | --- | --- |
|  | 11 | 12 | C-4 | C-5 | Base Fabric |
| Samples From the Toe Area | | | | | |
| MVTR$^2$ | 644 | 1215 | 1852 | 2155 | 5573 |
| Suter Test$^4$ | F2 | P3 | F1 | F1 | — |
| Samples From the Heel Area | | | | | |
| MVTR$^2$ | 846 | 9111 | 2948 | 2539 | 5573 |
| Suter Test$^4$ | F2 | P3 | F1 | F1 | — |

FIGS. 4, 5, 6 and 7 show the cross-sectional SEM pictures of the samples described in Examples C-5, C-4, 11 and 12 respectively Example 13

A woven sock made of 93/7 cotton/Lycra Spandex (women's style 9031 Charter Club from R. H. Macy and Co., Inc.) was treated with fluorochemicals to give an oil rating of #6. Before treatment, the oil rating of the sock was less than #1. The treated sock was then coated following steps 1 and 2 as described in Example 11 except that a smaller footform (women's size 6) was used. The footform was then taken out of the water and air dried. The coated sock was then stripped of the footform to give a seamless shaped article. Although stiffer than the original sock, the coated sock was elastic and soft enough to provide a snug and comfortable fit to the foot. The coated sock showed no sign of water leakage when it was filled with 500 cc of water and the MVTR in the area just above the ankle was 422.

Figure 8:
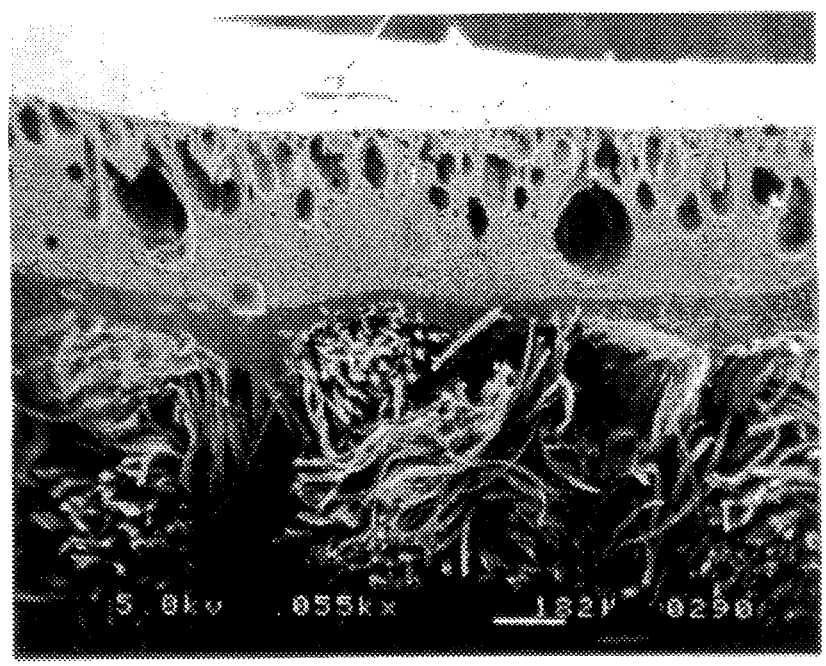
FIG. 8 is a photomicrograph of the cross-section of the sample described in Example 13 at 55× magnification.

FIG. 8 shows an SEM micrograph of the cross-section of the sample described in Example 13.

We claim:

1. A shaped article consisting of:

(a) a seamless three-dimensional layered composite that is flexible, waterproof, and water vapor permeable in which;

(b) the composite consists of:

(i) a microporous, elastomeric, thermoplastic polyester or polyether-polyurethane layer I that is water vapor permeable; and (ii) a continuous, nonporous elastomeric polymer layer II selected from the class consisting of a copolyetherester, a copolyetheresteramide, and a polyurethane, said polymer being waterproof and water vapor permeable.

2. The shaped article of claim 1 wherein the article is a glove, mitten, stocking, or sock that is form-fitting.

3. The shaped article of claim 1 or 2 wherein the article is laminated to a fabric.

4. The shaped article of claim 1 wherein the continuous, nonporous elastomeric polymer layer II is a copolyetherester.

5. The shaped article claim 1 or 2 wherein in the composite, layer I is the reaction product of (A) a linear hydroxyl terminated polyester or polyether polyol and (B) a diisocyanate and a low molecular weight diol.

* * * * *